(12) United States Patent
Sugimori

(10) Patent No.: US 12,719,288 B2
(45) Date of Patent: Aug. 25, 2026

(54) SOLAR POWER GENERATION SYSTEM AND CONTROL DEVICE

(71) Applicant: TMEIC Corporation, Tokyo (JP)

(72) Inventor: Satoshi Sugimori, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 19/118,793

(22) PCT Filed: Jul. 14, 2023

(86) PCT No.: PCT/JP2023/026132

§ 371 (c)(1),
(2) Date: Apr. 7, 2025

(87) PCT Pub. No.: WO2025/017803

PCT Pub. Date: Jan. 23, 2025

(65) Prior Publication Data

US 2026/0142472 A1 May 21, 2026

(51) Int. Cl.
*H02J 3/48* (2026.01)
*H02J 101/24* (2026.01)
*H02S 40/32* (2014.01)

(52) U.S. Cl.
CPC ................ *H02J 3/48* (2013.01); *H02S 40/32* (2014.12); *H02J 2101/24* (2026.01)

(58) Field of Classification Search
CPC .......... H02J 3/48; H02J 2101/24; H02S 40/32
USPC ......................... 307/82, 77; 323/222; 363/95
See application file for complete search history.

(56) References Cited

U.S. PATENT DOCUMENTS

2024/0204720 A1* 6/2024 Koike ..................... H02J 3/381

FOREIGN PATENT DOCUMENTS

JP 2013-207862 A 10/2013

OTHER PUBLICATIONS

International Search Report and Written Opinion mailed on Sep. 5, 2023, received for PCT Application PCT/JP2023/026132, filed on Jul. 14, 2023, 13 pages including English Translation.
Office Action issued on Feb. 13, 2026, in corresponding Japanese patent Application No. 2025-533742, 10 pages.

* cited by examiner

*Primary Examiner* — Arnold M Kinkead
(74) *Attorney, Agent, or Firm* — XSENSUS LLP

(57) ABSTRACT

A solar power generation system includes a plurality of solar cell panels; a plurality of power converters that convert DC power to AC power; and a control device that controls an operation of the plurality of power converters, the control device including a total output calculation unit configured to calculate an active power total value indicating a magnitude of an active power currently outputtable from all of the plurality of power converters, a difference calculation unit configured to calculate a first difference between a total upper limit command value and the active power total value, and an upper limit command value calculation unit configured to calculate, based on active power values of the plurality of respective power converters and the first difference, an individual upper limit command value indicating an upper limit of an active power individually output from each of the plurality of power converters.

4 Claims, 4 Drawing Sheets

SOLAR POWER GENERATION SYSTEM AND CONTROL DEVICE

CROSS-REFERENCE TO RELATED APPLICATION

This application is a national stage application, pursuant to 35 U.S.C. § 371, of International Patent Application No. PCT/JP2023/026132, filed Jul. 14, 2023, the entire contents of which are incorporated herein by reference.

TECHNICAL FIELD

Embodiments of the invention relate to a solar power generation system and a control device.

BACKGROUND ART

A solar power generation system including a plurality of solar cell panels, a plurality of power converters, and a control device is known. The plurality of power converters are provided so as to correspond to the plurality of solar cell panels respectively. Each of the power converters is connected to a corresponding one of the solar cell panels and is also connected to a power system. Each of the power converters converts DC power supplied from a corresponding one of the solar cell panels into AC power corresponding to the power system and supplies the AC power after conversion to the power system. The control device controls the power conversion operation of the plurality of power converters.

For the solar power generation system, the upper limit of an active power outputtable to the power system is determined in advance to reduce fluctuations in the frequency and voltage of the power system. The control device controls the operation of the plurality of power converters such that the total active power of the AC power output from the plurality of power converters does not exceed the upper limit.

The control device calculates an individual upper limit of each of the plurality of power converters by dividing the upper limit of the active power of the entire system by the number of the plurality of power converters to make the active power of the AC power of each of the plurality of power converters be less than or equal to the individual upper limit. Accordingly, the total active power of the AC power output from the plurality of power converters can be made less than or equal to the upper limit of the active power of the entire system.

However, when the individual upper limit of each of the plurality of power converters is set as described above, for example, in a case where an upper limit lower than the rated output of the system is set and where an imbalance in solar radiation is seen among the plurality of solar cell panels, the total active power of the AC power to be supplied from the plurality of power converters to the power system is likely to be made lower than necessary.

For example, a case is assumed where there are two power converters and the upper limit of the active power of the entire system is 10 kW. In this case, the individual upper limit is set to 5 kW with the above-described calculation method. When it is assumed that the outputtable active power of one of the power converters is 6 kW and the outputtable active power of the other power converter is 4 kW, the entire system can output an active power of 10 kW, however, the active power of the one of the power converters is limited to 5 kW from 6 kW due to the individual upper limit, and accordingly, only an active power of 9 kW is output to the power system in total.

As described above, when the individual upper limit is calculated as described above, the total active power of the AC power to be supplied from the plurality of power converters to the power system is likely to be made lower than necessary. For example, generated power may be wasted. Further, for the operator of the solar power generation system, this may lead to, for example, a decrease in the income from power selling.

Therefore, it is desirable for the solar power generation system and the control device used therein to be able to reduce the likelihood that the total active power of the AC power to be supplied from the plurality of power converters to the power system is made lower than necessary.

PRIOR ART DOCUMENTS

Patent Literature

[Patent Literature 1] JP2013-207862A

SUMMARY OF INVENTION

Problem to be Solved by the Invention

An embodiment of the invention provides a solar power generation system and a control device that can reduce the likelihood that the total active power of AC power to be supplied from a plurality of power converters to a power system is made lower than necessary.

Means for Solving the Problem

According to an embodiment of the invention, there is provided a solar power generation system including: a plurality of solar cell panels; a plurality of power converters provided so as to correspond to the plurality of solar cell panels respectively, and configured to convert DC power supplied from the plurality of solar cell panels to AC power corresponding to a power system and supply the AC power after conversion to the power system; and a control device configured to control a power conversion operation of the plurality of power converters, the control device including a total output calculation unit configured to calculate an active power total value indicating a magnitude of an active power currently outputtable from all of the plurality of power converters, by receiving an input of active power values indicating magnitudes of currently outputtable active powers of the plurality of respective power converters and by adding up the active power values of the plurality of respective power converters, a difference calculation unit configured to receive an input of the active power total value and receive an input of a total upper limit command value indicating an upper limit of an active power output from all of the plurality of power converters, and calculate a first difference between the total upper limit command value and the active power total value, and an upper limit command value calculation unit configured to receive an input of the first difference and receive an input of the active power values of the plurality of respective power converters, and calculate, based on the active power values of the plurality of respective power converters and the first difference, an individual upper limit command value indicating an upper limit of an active power individually output from each of the plurality of power converters, the upper limit command value calculation unit being configured to calculate a second difference by dividing the first difference by a number of power converters among the plurality of power converters, each power converter of the power converters having a difference less than or equal to a first reference value, the difference being obtained by subtracting a current active power value from a current individual upper limit command value, and add the calculated second difference to the current individual upper limit command value of the power converter having a difference less than or equal to the first reference value, the difference being obtained by subtracting the current active power value from the current individual upper limit command value, thereby calculating a new individual upper limit command value of the power converter having the difference less than or equal to the first reference value.

Advantageous Effects of Invention

According to an embodiment of the invention, a solar power generation system and a control device that can reduce the likelihood that the total active power of AC power to be supplied from a plurality of power converters to a power system is made lower than necessary are provided.

DESCRIPTION OF EMBODIMENTS

Figure 1:
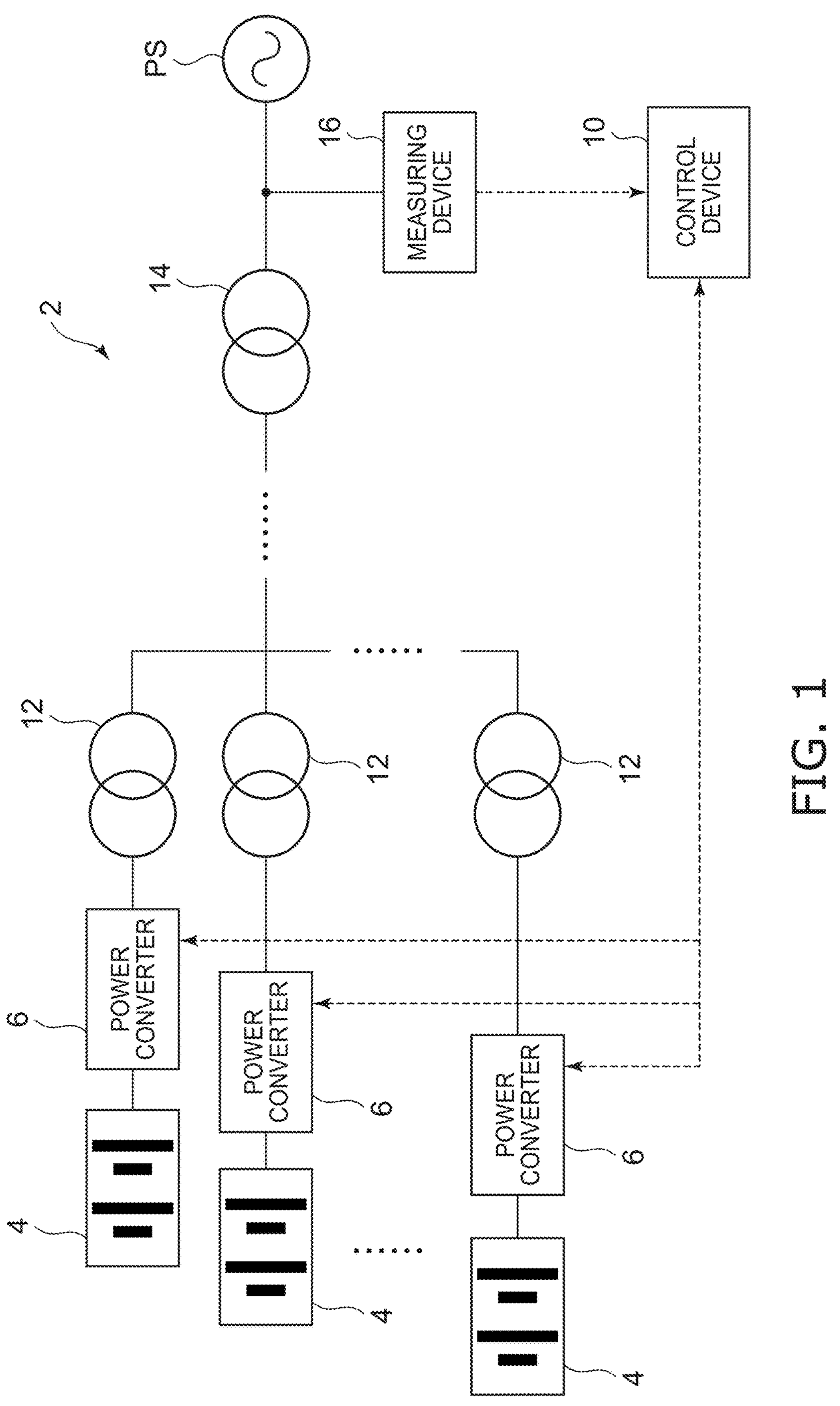
FIG. 1 is a block diagram schematically illustrating a solar power generation system according to an embodiment.

Hereinafter, embodiments will be described with reference to the drawings.

Note that the drawings are schematic or conceptual, and the relationship between the thickness and width of each portion, the proportions of sizes among portions, and so on are not necessarily the same as the actual values. Even the dimensions and proportion of the same portion may be illustrated differently depending on the drawing.

In the specification and drawings, components similar to those described in regard to a drawing thereinabove are marked with like reference numerals, and a detailed description is omitted as appropriate.

FIG. 1 is a block diagram schematically illustrating a solar power generation system according to an embodiment.

As shown in FIG. 1, a solar power generation system 2 includes a plurality of solar cell panels 4, a plurality of power converters 6, and a control device 10. The plurality of solar cell panels 4 convert light energy into electrical energy by photoelectric conversion to thereby supply DC power.

The plurality of power converters 6 are provided so as to correspond to the plurality of solar cell panels 4 respectively. The number of the plurality of power converters 6 is, for example, the same as the number of the plurality of solar cell panels 4. The plurality of power converters 6 are connected to the plurality of solar cell panels 4 respectively. However, multiple solar cell panels 4 may be connected to one power converter 6. The number of the plurality of power converters 6 need not necessarily be the same as the number of the plurality of solar cell panels 4.

The solar power generation system 2 further includes, for example, a plurality of transformers 12 and a transformer 14. The plurality of transformers 12 are provided so as to correspond to the plurality of power converters 6 respectively. The plurality of power converters 6 are connected to the primary sides of the plurality of transformers 12 respectively. The secondary sides of the plurality of transformers 12 are connected to the primary side of the transformer 14. The secondary side of the transformer 14 is connected to a power system PS. The plurality of power converters 6 are connected to the power system PS via the transformers 12 and 14 and so on. Between the power converters 6 and the power system PS, a breaker, other more transformers, and so on may be provided. The configuration between the power converters 6 and the power system PS may be any configuration with which the power converters 6 can be connected to the power system PS.

The power of the power system PS is AC power. The power of the power system PS is, for example, three-phase AC power. However, the power of the power system PS may be, for example, single-phase AC power.

The plurality of power converters 6 convert the DC power supplied from the plurality of solar cell panels 4 into AC power corresponding to the power system PS and supplies the AC power after conversion to the power system PS. The plurality of power converters 6 each include, for example, a plurality of switching elements, and perform power conversion by switching of the plurality of switching elements.

The control device 10 controls the power conversion operation of the plurality of power converters 6. Accordingly, the solar power generation system 2 supplies the power generated by the plurality of solar cell panels 4 to the power system PS. The control device 10 may be called, for example, a PPC (power plant controller).

The solar power generation system 2 further includes, for example, a measuring device 16. The measuring device 16 detects, for example, an active power value, a reactive power value, and a voltage value at an interconnection point between the plurality of power converters 6 and the power system PS and inputs the detected active power value, reactive power value, and voltage value into the control device 10.

Figure 2:
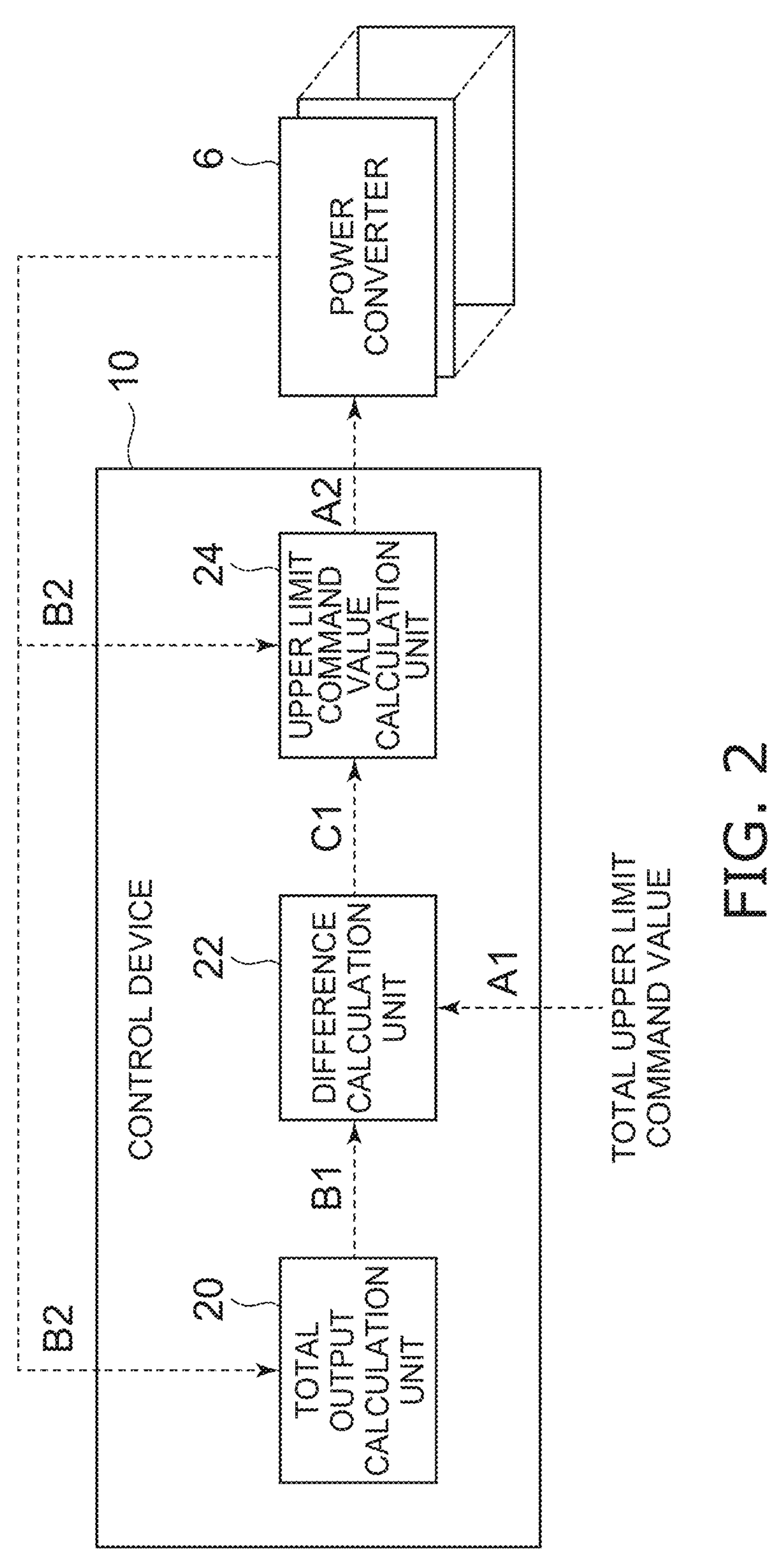
FIG. 2 is a block diagram schematically illustrating a control device according to the embodiment.

FIG. 2 is a block diagram schematically illustrating the control device according to the embodiment.

As shown in FIG. 2, the control device 10 includes a total output calculation unit 20, a difference calculation unit 22, and an upper limit command value calculation unit 24.

The total output calculation unit 20 receives an input of an active power value B2 indicating the magnitude of a currently outputtable active power of each of the plurality of power converters 6. For example, the control device 10 communicates with each of the plurality of power converters 6 to thereby receive an input of the active power value B2 from each of the plurality of power converters 6. The plurality of active power values B2 of the plurality of respective power converters 6 may be, for example, input into the control device 10 from a higher-level controller. The method for inputting the plurality of active power values B2 into the control device 10 is not limited to the above-described methods, and any method with which the plurality of active power values B2 can be appropriately input into the control device 10 may be employed.

The total output calculation unit 20 adds up the active power values B2 of the plurality of respective power converters 6 to thereby calculate an active power total value B1 indicating the magnitude of an active power currently outputtable from all of the plurality of power converters 6.

More specifically, when the number of the plurality of power converters 6 is denoted by N, the active power value B2 of the first power converter 6 is denoted by B2*a*, the active power value B2 of the second power converter 6 is denoted by B2*b*, and the active power value B2 of the N-th power converter 6 is denoted by B2*n*, the total output calculation unit 20 calculates the active power total value B1 by using an equation B1=B2*a*+B2*b*+ . . . +B2*n*. In other words, the active power total value B1 is the sum total of the active power values B2 of the plurality of respective power converters 6. The total output calculation unit 20 inputs the calculated active power total value B1 into the difference calculation unit 22.

The difference calculation unit 22 receives the input of the active power total value B1 from the total output calculation unit 20 and receives an input of a total upper limit command value A1 indicating the upper limit of an active power output from all of the plurality of power converters 6. In other words, the total upper limit command value A1 is a command value that indicates the upper limit of an active power to be supplied from the solar power generation system 2 to the power system PS. The total upper limit command value A1 is input into the control device 10 from, for example, a higher-level controller. The total upper limit command value A1 may be input into the control device 10, for example, on the basis of an operation by, for example, the administrator of the solar power generation system 2. The total upper limit command value A1 may be, for example, a preset certain value. The method for inputting the total upper limit command value A1 into the control device 10 is not limited to the above-described methods, and any method with which the total upper limit command value A1 can be appropriately input into the control device 10 may be employed.

The difference calculation unit 22 subtracts the active power total value B1 from the input total upper limit command value A1 to thereby calculate a first difference C1 between the total upper limit command value A1 and the active power total value B1. That is, the difference calculation unit 22 calculates the first difference C1 by using an equation C1=A1−B1. The difference calculation unit 22 inputs the calculated first difference C1 into the upper limit command value calculation unit 24.

The upper limit command value calculation unit 24 receives the input of a second difference C2 from the difference calculation unit 22 and receives an input of the active power values B2 of the plurality of respective power converters 6. The plurality of active power values B2 are input into the upper limit command value calculation unit 24 from, for example, the plurality of power converters 6 as in the case of the total output calculation unit 20. Based on the input second difference C2 and each of the input active power values B2, the upper limit command value calculation unit 24 calculates individual upper limit command values A2 indicating the upper limits of active powers individually output from the plurality of respective power converters 6.

After calculating the plurality of individual upper limit command values A2 respectively corresponding to the plurality of power converters 6, the control device 10 controls the operation of each of the plurality of power converters 6 such that the active power output from each of the plurality of power converters 6 does not exceed a corresponding one of the individual upper limit command values A2. Accordingly, an active power having an appropriate magnitude according to the total upper limit command value A1 can be supplied from the solar power generation system 2 to the power system PS.

The control device 10 controls the operation of each of the plurality of power converters 6 such that the active power output from each of the plurality of power converters 6 does not exceed a corresponding one of the individual upper limit command values A2, for example, by inputting each of the plurality of calculated individual upper limit command values A2 into a corresponding one of the plurality of power converters 6.

The control by the control device 10 is not limited to this, and the control device 10 may control the operation of each of the plurality of power converters 6 such that the active power output from each of the plurality of power converters 6 does not exceed a corresponding one of the individual upper limit command values A2, for example, by generating control signals according to the individual upper limit command values A2 and inputting the control signals into the respective power converters 6. The control device 10 may input the individual upper limit command values A2 directly into the respective power converters 6 or may input other control signals according to the individual upper limit command values A2 into the respective power converters 6.

Figure 3:
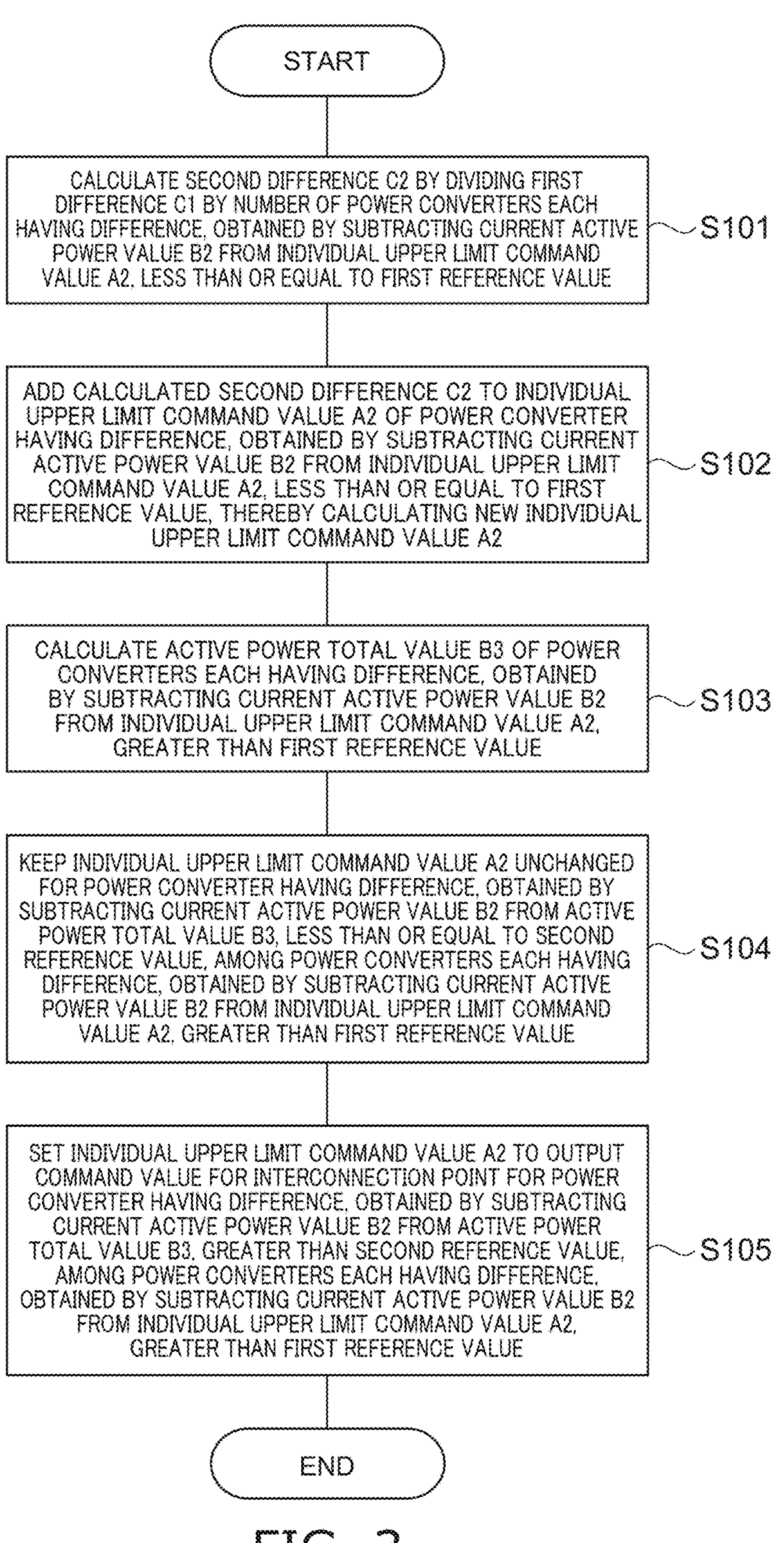
FIG. 3 is a flowchart schematically illustrating an example operation of the control device according to the embodiment.

FIG. 3 is a flowchart schematically illustrating an example operation of the control device according to the embodiment.

Figure 4:
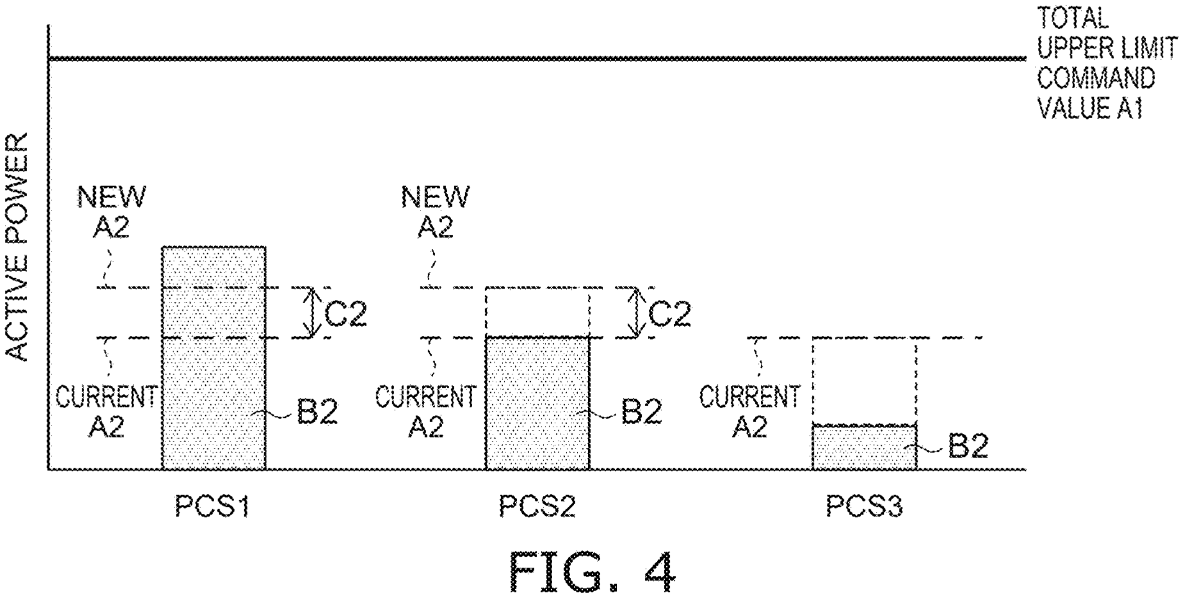
FIG. 4 is a graph schematically showing an example operation of the control device according to the embodiment.

FIG. 4 is a graph schematically showing an example operation of the control device according to the embodiment.

FIG. 3 schematically shows an example operation of calculating the plurality of individual upper limit command values A2 by the upper limit command value calculation unit 24. FIG. 4 is a bar chart showing the active power value B2 of the first power converter 6 (PCS1), the active power value B2 of the second power converter 6 (PCS2), and the active power value B2 of the third power converter 6 (PCS3).

In a case of calculating the plurality of individual upper limit command values A2, the upper limit command value calculation unit 24 first calculates a second difference C2 by dividing the first difference C1 by the number of power converters 6 each having a difference less than or equal to a first reference value, the difference being obtained by subtracting the current active power value B2 from the current individual upper limit command value A2 (step S101 in FIG. 3).

The first reference value is set to, for example, zero. In this case, the power converter 6 having a difference less than or equal to the first reference value, the difference being obtained by subtracting the current active power value B2 from the individual upper limit command value A2, is the power converter 6 having the current active power value B2 greater than or equal to the individual upper limit command value A2. For example, in the example shown in FIG. 4, PCS1 and PCS2 correspond to the power converter 6 having the difference less than or equal to the first reference value. In this case, the upper limit command value calculation unit 24 divides the first difference C1 by "2", which indicates the number of PCS1 and PCS2, to thereby calculate the second difference C2.

The example shown in FIG. 4 shows a state in which an initial value of the individual upper limit command values A2 is set as the current individual upper limit command values A2. The initial value of the plurality of individual upper limit command values A2 is set to a value obtained by, for example, dividing the total upper limit command value A1 by the number of the plurality of power converters 6. The initial value of the individual upper limit command values A2 is set, for example, when the operation of the solar power generation system 2 starts or when a predetermined setting operation is performed.

Note that the first reference value is not limited to zero and may be any value. For example, the first reference value may be set to a positive value so as to enable detection of a state in which the current active power value B2 is slightly smaller than the current individual upper limit command value A2, or may be set to a negative value so as to enable detection of a state in which the current active power value B2 is larger than the current individual upper limit command value A2. However, it is more preferable to set the first reference value so as to enable detection of a state in which the current active power value B2 is greater than or equal to the current individual upper limit command value A2.

After calculating the second difference C2, the upper limit command value calculation unit 24 adds the calculated second difference C2 to the current individual upper limit command value A2 of the power converter 6 having a difference less than or equal to the first reference value, the difference being obtained by subtracting the current active power value B2 from the current individual upper limit command value A2, thereby calculating a new individual upper limit command value A2 of the power converter 6 having the difference less than or equal to the first reference value (step S102 in FIG. 3).

For example, in the example shown in FIG. 4, the upper limit command value calculation unit 24 adds the second difference C2 to the current individual upper limit command values A2 of PCS1 and PCS2 to thereby calculate the new individual upper limit command values A2 of PCS1 and PCS2.

After calculating the new individual upper limit command value A2 of the power converter 6 having the difference less than or equal to the first reference value, the upper limit command value calculation unit 24 calculates an active power total value B3 of the power converters 6 each having a difference greater than the first reference value, the difference being obtained by subtracting the current active power value B2 from the current individual upper limit command value A2 (step S103 in FIG. 3).

In the example shown in FIG. 4, only PCS3 corresponds to the power converter 6 having the difference greater than the first reference value. In this case, the active power total value B3 is a value the same as the current active power value B2 of PCS3. In other words, the power converter 6 having the difference greater than the first reference value is the power converter 6 having the current active power value B2 smaller than the current individual upper limit command value A2.

After calculating the active power total value B3, the upper limit command value calculation unit 24 keeps the individual upper limit command value A2 unchanged for the power converter 6 having a difference less than or equal to a second reference value, the difference being obtained by subtracting the current active power value B2 from the active power total value B3, among the power converters 6 each having a difference greater than the first reference value, the difference being obtained by subtracting the current active power value B2 from the current individual upper limit command value A2 (step S104 in FIG. 3). For example, the upper limit command value calculation unit 24 keeps the individual upper limit command value A2 unchanged for PCS3.

On the other hand, the upper limit command value calculation unit 24 sets the individual upper limit command value A2 to an output command value for the interconnection point for the power converter 6 having a difference greater than the second reference value, the difference being obtained by subtracting the current active power value B2 from the active power total value B3, among the power converters 6 each having a difference greater than the first reference value, the difference being obtained by subtracting the current active power value B2 from the current individual upper limit command value A2 (step S105 in FIG. 3).

The output command value for the interconnection point is, for example, a value obtained by dividing the total upper limit command value A1 by the number of the plurality of power converters 6. In other words, the output command value for the interconnection point is the initial value of the individual upper limit command values A2. When, for example, the current active power value B2 is smaller than the active power total value B3 by the second reference value or more, the upper limit command value calculation unit 24 restores the individual upper limit command value A2 to the initial value. Accordingly, the likelihood that the individual upper limit command value A2 that is excessively high is set for the power converter 6 having the current active power value B2 that is small can be reduced.

For example, the control device 10 obtains the active power value B2 of each of the plurality of power converters 6, obtains the total upper limit command value A1, and calculates the first difference C1 for each of predetermined control cycles. For example, for each of the predetermined control cycles, the upper limit command value calculation unit 24 performs the processes in steps S101 to S105 described above to thereby calculate the plurality of individual upper limit command values A2 for each of the predetermined control cycles. Accordingly, the active power total value B1 can be made closer to the total upper limit command value A1.

Note that step S104 and step S105 can be flipped. That is, step S104 may be performed after step S105. Further, steps S101 and S102 may be performed after steps S103 to S105.

Figure 5:
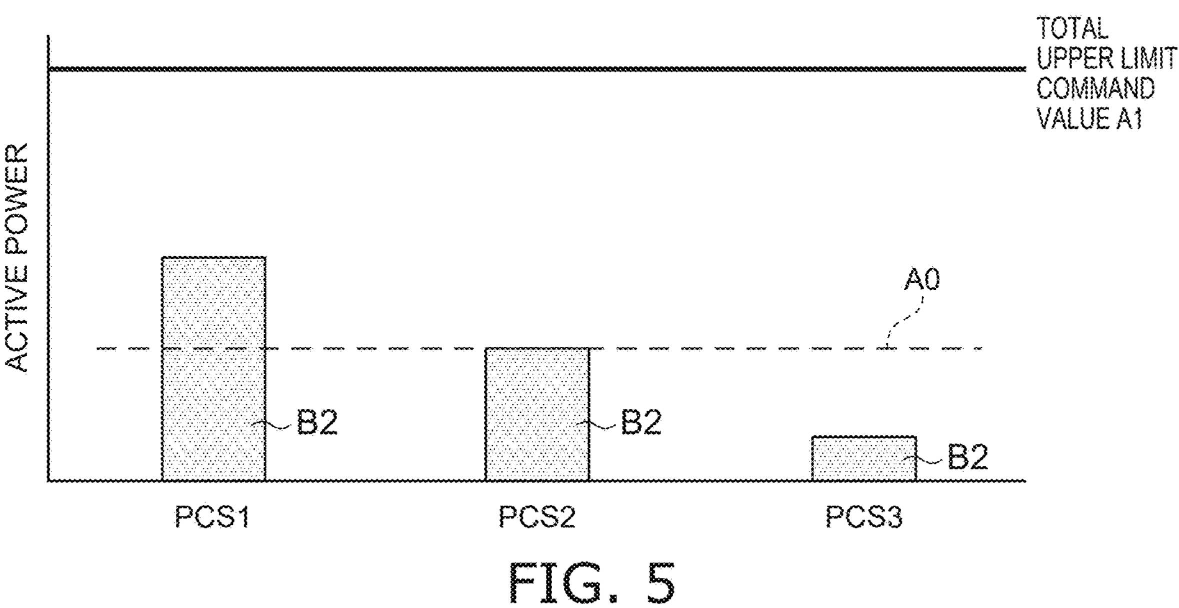
FIG. 5 is a graph schematically showing an example operation of the control device for reference.

FIG. 5 is a graph schematically showing an example operation of the control device for reference.

FIG. 5 is a bar chart showing the active power value B2 of the first power converter 6 (PCS1), the active power value B2 of the second power converter 6 (PCS2), and the active power value B2 of the third power converter 6 (PCS3) as in FIG. 4.

FIG. 5 schematically shows an example operation of the control device for reference when a common upper limit command value A0 is set for the plurality of power converters 6 by dividing the total upper limit command value A1 by N, which is the number of the plurality of power converters 6.

In the example shown in FIG. 5, the output of PCS1 is limited to the upper limit command value A0. Meanwhile, in the example shown in FIG. 5, the output of PCS3 is lower than the upper limit command value A0. Therefore, in the example shown in FIG. 5, for example, the output of the entire system becomes lower than the total upper limit command value A1 by the difference between the upper limit command value A0 and the active power value B2 of PCS3. In the example shown in FIG. 5, although PCS1 allows a sufficiently large output, the output of the entire system becomes lower than the total upper limit command value A1.

As described above, when the common upper limit command value A0 is set for the plurality of power converters 6, for example, in a case where the total upper limit command value A1 lower than the rated output (maximum outputtable active power) of the solar power generation system 2 is set and where an imbalance in solar radiation is seen among the plurality of solar cell panels 4, the total active power of the AC power to be supplied from the plurality of power converters 6 to the power system PS is likely to be made lower than necessary.

In contrast, the control device 10 of the solar power generation system 2 according to the embodiment calculates the second difference C2 by dividing the first difference C1 by the number of power converters 6 each having a difference less than or equal to the first reference value, the difference being obtained by subtracting the current active power value B2 from the current individual upper limit command value A2, and adds the second difference C2 to the current individual upper limit command value A2 of the power converter 6 having a difference less than or equal to the first reference value, the difference being obtained by subtracting the current active power value B2 from the current individual upper limit command value A2, to thereby calculate the new individual upper limit command value A2.

Accordingly, even when an imbalance is seen among the active power values B2 of the plurality of respective power converters 6 as shown in, for example, FIG. 4, the individual upper limit command values A2 having appropriate magnitudes corresponding to the respective active power values B2 can be set for the plurality of power converters 6 respectively. In other words, the total upper limit command value A1 can be appropriately divided among the plurality of power converters 6.

Therefore, for example, in a case where the total upper limit command value A1 lower than the rated output of the solar power generation system 2 is set and where an imbalance in solar radiation is seen among the plurality of solar cell panels 4, the likelihood that the total active power of the AC power to be supplied from the plurality of power converters 6 to the power system PS is made lower than necessary can be reduced.

For example, the total active power (active power total value B1) of the AC power to be supplied from the plurality of power converters 6 to the power system PS can be made closer to the total upper limit command value A1 than in the case where the common upper limit command value A0 is set for the plurality of power converters 6. Accordingly, for example, a waste of generated power can be reduced. Further, for example, for the operator of the solar power generation system 2, a decrease in the income from power selling can be reduced.

In the above-described embodiment, among the power converters 6 each having a difference greater than the first reference value, the difference being obtained by subtracting the current active power value B2 from the current individual upper limit command value A2, for the power converter 6 having a difference less than or equal to the second reference value, the difference being obtained by subtracting the current active power value B2 from the active power total value B3, the individual upper limit command value A2 is kept unchanged, and for the power converter 6 having a difference greater than the second reference value, the difference being obtained by subtracting the current active power value B2 from the active power total value B3, the individual upper limit command value A2 is set to the output command value for the interconnection point.

The setting of the individual upper limit command value A2 is not limited to this and, for example, for the power converters 6 each having a difference greater than the first reference value, the difference being obtained by subtracting the current active power value B2 from the current individual upper limit command value A2, the individual upper limit command values A2 of all of the applicable power converters 6 may be kept unchanged.

The embodiment includes the following forms.

APPENDIX 1

A solar power generation system including:
- a plurality of solar cell panels;
- a plurality of power converters provided so as to correspond to the plurality of solar cell panels respectively, and configured to convert DC power supplied from the plurality of solar cell panels to AC power corresponding to a power system and supply the AC power after conversion to the power system; and
- a control device configured to control a power conversion operation of the plurality of power converters, the control device including
- a total output calculation unit configured to calculate an active power total value indicating a magnitude of an active power currently outputtable from all of the plurality of power converters, by receiving an input of active power values indicating magnitudes of currently outputtable active powers of the plurality of respective power converters and by adding up the active power values of the plurality of respective power converters,
- a difference calculation unit configured to receive an input of the active power total value and receive an input of a total upper limit command value indicating an upper limit of an active power output from all of the plurality of power converters, and calculate a first difference between the total upper limit command value and the active power total value, and
- an upper limit command value calculation unit configured to receive an input of the first difference and receive an input of the active power values of the plurality of respective power converters, and calculate, based on the active power values of the plurality of respective power converters and the first difference, an individual upper limit command value indicating an upper limit of an active power individually output from each of the plurality of power converters, the upper limit command value calculation unit being configured to calculate a second difference by dividing the first difference by a number of power converters among the plurality of power converters, each power converter of the power converters having a difference less than or equal to a first reference value, the difference being obtained by subtracting a current active power value from a current individual upper limit command value, and add the calculated second difference to the current individual upper limit command value of the power converter having a difference less than or equal to the first reference value, the difference being obtained by subtracting the current active power value from the current individual upper limit command value, thereby calculating a new individual upper limit command value of the power converter having the difference less than or equal to the first reference value.

APPENDIX 2

The solar power generation system according to appendix 1, in which the upper limit command value calculation unit is configured to calculate an active power total value of power converters among the plurality of power converters, each power converter of the power converters having a difference greater than the first reference value, the difference being obtained by subtracting the current active power value from the current individual upper limit command value, and keep the individual upper limit command value unchanged for a power converter among the power converters each having the difference greater than the first reference value, the power converter having a difference less than or equal to a second reference value, the difference being obtained by subtracting the current active power value from the active power total value.

APPENDIX 3

The solar power generation system according to appendix 2, in which the upper limit command value calculation unit is configured to set the individual upper limit command value to an output command value for an interconnection point, for a power converter among the power converters each having the difference greater than the first reference value, the power converter having a difference greater than the second reference value, the difference being obtained by subtracting the current active power value from the active power total value.

APPENDIX 4

A control device configured to control a power conversion operation of a plurality of power converters, the plurality of power converters being provided so as to correspond to a plurality of solar cell panels respectively and being configured to convert DC power supplied from the plurality of solar cell panels to AC power corresponding to a power system and supply the AC power after conversion to the power system, the control device including:

- a total output calculation unit configured to calculate an active power total value indicating a magnitude of an active power currently outputtable from all of the plurality of power converters, by receiving an input of active power values indicating magnitudes of currently outputtable active powers of the plurality of respective power converters and by adding up the active power values of the plurality of respective power converters;
- a difference calculation unit configured to receive an input of the active power total value and receive an input of a total upper limit command value indicating an upper limit of an active power output from all of the plurality of power converters, and calculate a first difference between the total upper limit command value and the active power total value; and
- an upper limit command value calculation unit configured to receive an input of the first difference and receive an input of the active power values of the plurality of respective power converters, and calculate, based on the active power values of the plurality of respective power converters and the first difference, an individual upper limit command value indicating an upper limit of an active power individually output from each of the plurality of power converters,
- the upper limit command value calculation unit being configured to calculate a second difference by dividing the first difference by a number of power converters among the plurality of power converters, each power converter of the power converters having a difference less than or equal to a first reference value, the difference being obtained by subtracting a current active power value from a current individual upper limit command value, and add the calculated second difference to the current individual upper limit command value of the power converter having a difference less than or equal to the first reference value, the difference being obtained by subtracting the current active power value from the current individual upper limit command value, thereby calculating a new individual upper limit command value of the power converter having the difference less than or equal to the first reference value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

REFERENCE NUMERAL LIST

2 solar power generation system, 4 solar cell panel, 6 power converter, 10 control device, 12, 14 transformer, 20 total output calculation unit, 22 difference calculation unit, 24 upper limit command value calculation unit

The invention claimed is:

1. A solar power generation system comprising:

a plurality of solar cell panels;

a plurality of power converters provided so as to correspond to the plurality of solar cell panels respectively, and configured to convert DC power supplied from the plurality of solar cell panels to AC power corresponding to a power system and supply the AC power after conversion to the power system; and a control device configured to control a power conversion operation of the plurality of power converters, the control device including

- a total output calculation unit configured to calculate an active power total value indicating a magnitude of an active power currently outputtable from all of the plurality of power converters, by receiving an input of active power values indicating magnitudes of currently outputtable active powers of the plurality of respective power converters and by adding up the active power values of the plurality of respective power converters,
- a difference calculation unit configured to receive an input of the active power total value and receive an input of a total upper limit command value indicating an upper limit of an active power output from all of the plurality of power converters, and calculate a first difference between the total upper limit command value and the active power total value, and
- an upper limit command value calculation unit configured to receive an input of the first difference and receive an input of the active power values of the plurality of respective power converters, and calculate, based on the active power values of the plurality of respective power converters and the first difference, an individual upper limit command value indicating an upper limit of an active power individually output from each of the plurality of power converters, the upper limit command value calculation unit being configured to calculate a second difference by dividing the first difference by a number of power converters among the plurality of power converters, each power converter of the power converters having a difference less than or equal to a first reference value, the difference being obtained by subtracting a current active power value from a current individual upper limit command value, and add the calculated second difference to the current individual upper limit command value of the power converter having a difference less than or equal to the first reference value, the difference being obtained by subtracting the current active power value from the current individual upper limit command value, thereby calculating a new individual upper limit command value of the power converter having the difference less than or equal to the first reference value.

2. The solar power generation system according to claim 1, wherein the upper limit command value calculation unit is configured to calculate an active power total value of power converters among the plurality of power converters, each power converter of the power converters having a difference greater than the first reference value, the difference being obtained by subtracting the current active power value from the current individual upper limit command value, and keep the individual upper limit command value unchanged for a power converter among the power converters each having the difference greater than the first reference value, the power converter having a difference less than or equal to a second reference value, the difference being obtained by subtracting the current active power value from the active power total value.

3. The solar power generation system according to claim 2, wherein the upper limit command value calculation unit is configured to set the individual upper limit command value to an output command value for an interconnection point, for a power converter among the power converters each having the difference greater than the first reference value, the power converter having a difference greater than the second reference value, the difference being obtained by subtracting the current active power value from the active power total value.

4. A control device configured to control a power conversion operation of a plurality of power converters, the plurality of power converters being provided so as to correspond to a plurality of solar cell panels respectively and being configured to convert DC power supplied from the plurality of solar cell panels to AC power corresponding to a power system and supply the AC power after conversion to the power system, the control device comprising:

a total output calculation unit configured to calculate an active power total value indicating a magnitude of an active power currently outputtable from all of the plurality of power converters, by receiving an input of active power values indicating magnitudes of currently outputtable active powers of the plurality of respective power converters and by adding up the active power values of the plurality of respective power converters;

a difference calculation unit configured to receive an input of the active power total value and receive an input of a total upper limit command value indicating an upper limit of an active power output from all of the plurality of power converters, and calculate a first difference between the total upper limit command value and the active power total value; and an upper limit command value calculation unit configured to receive an input of the first difference and receive an input of the active power values of the plurality of respective power converters, and calculate, based on the active power values of the plurality of respective power converters and the first difference, an individual upper limit command value indicating an upper limit of an active power individually output from each of the plurality of power converters, the upper limit command value calculation unit being configured to calculate a second difference by dividing the first difference by a number of power converters among the plurality of power converters, each power converter of the power converters having a difference less than or equal to a first reference value, the difference being obtained by subtracting a current active power value from a current individual upper limit command value, and add the calculated second difference to the current individual upper limit command value of the power converter having a difference less than or equal to the first reference value, the difference being obtained by subtracting the current active power value from the current individual upper limit command value, thereby calculating a new individual upper limit command value of the power converter having the difference less than or equal to the first reference value.

* * * * *